Dec. 27, 1949　　　M. F. MOORE ET AL　　　2,492,923
AUTOMOTIVE DRIVING UNIT

Filed May 11, 1942　　　　　　　　　　　　　6 Sheets-Sheet 1

INVENTOR.
MEADE F. MOORE
WALLACE S. BERRY
BY Carl J. Barbee
THEIR ATTORNEY

Dec. 27, 1949  M. F. MOORE ET AL  2,492,923
AUTOMOTIVE DRIVING UNIT
Filed May 11, 1942  6 Sheets-Sheet 2

INVENTOR.
MEADE F MOORE
WALLACE S. BERRY
BY
THEIR ATTORNEY

Patented Dec. 27, 1949

2,492,923

UNITED STATES PATENT OFFICE 2,492,923

AUTOMOTIVE DRIVING UNIT

Meade F. Moore and Wallace S. Berry, Kenosha, Wis., assignors to Nash-Kelvinator Corporation, Kenosha, Wis., a corporation of Maryland Application May 11, 1942, Serial No. 442,534

3 Claims. (Cl. 192—.033)

1

This invention relates to the driving unit of an automobile and has particular reference to the combination of the engine, clutch and transmission of an automobile together with controlling apparatus for automatically effectuating the shifting of the transmission and engagement and disengagement of the clutch in accordance with the speed of an automobile and the preference of the driver for various speed ratios.

Many different arrangements of speed responsive transmission shifting mechanisms and power operated clutches have been devised in the past but it is believed that the arrangement disclosed in the present invention provides a more effective and inexpensive means for controlling the operation of an automobile in accordance with the normal driving practice of the average motorist than any of the prior structures.

It is an object of this invention to provide a driving unit for an automobile which will automatically provide a plurality of driving gear ratios, including neutral, with a minimum of motions on the part of the driver.

It is another object of this invention to provide a driving unit for an automobile which may be operated automatically or manually at the will of the driver.

It is another object of this invention to provide, in combination with a power operated clutch, a transmission which will shift automatically from a low gear ratio into a high gear ratio above a predetermined speed and which will automatically reassume the low gear ratio in response to a simple movement of the accelerator pedal, which is also connected to control operation of the clutch.

It is another object of this invention to provide means for preventing the operation of the clutch and shifting of the transmission by movement of the accelerator during certain speed ranges of the automobile.

It is another object of this invention to provide a novel change speed transmission particularly adaptable for use with a fluid coupling, automatic clutch and power shifting mechanism.

It is another object of this invention to provide a fluid clutch in combination with an automatically engageable friction clutch in such a manner as to provide smoother, more flexible operation of the automobile and to eliminate creeping while the engine is idling.

It is another object of this invention to provide novel control circuits for an automatic transmission and clutch in an automobile, which controls

2 are so arranged that operation of the automobile is greatly simplified.

Other objects and advantages of this invention will be apparent from a consideration of the following description and claims and the attached drawings, of which there are six sheets, and in which—

Figure 17 represents a diagram showing the wiring circuits and piping connections for controlling the throttle, clutch and transmission; and Figure 18 represents a schematic wiring diagram of the electrical circuits for controlling the engine, clutch and transmission.

Figure 1:
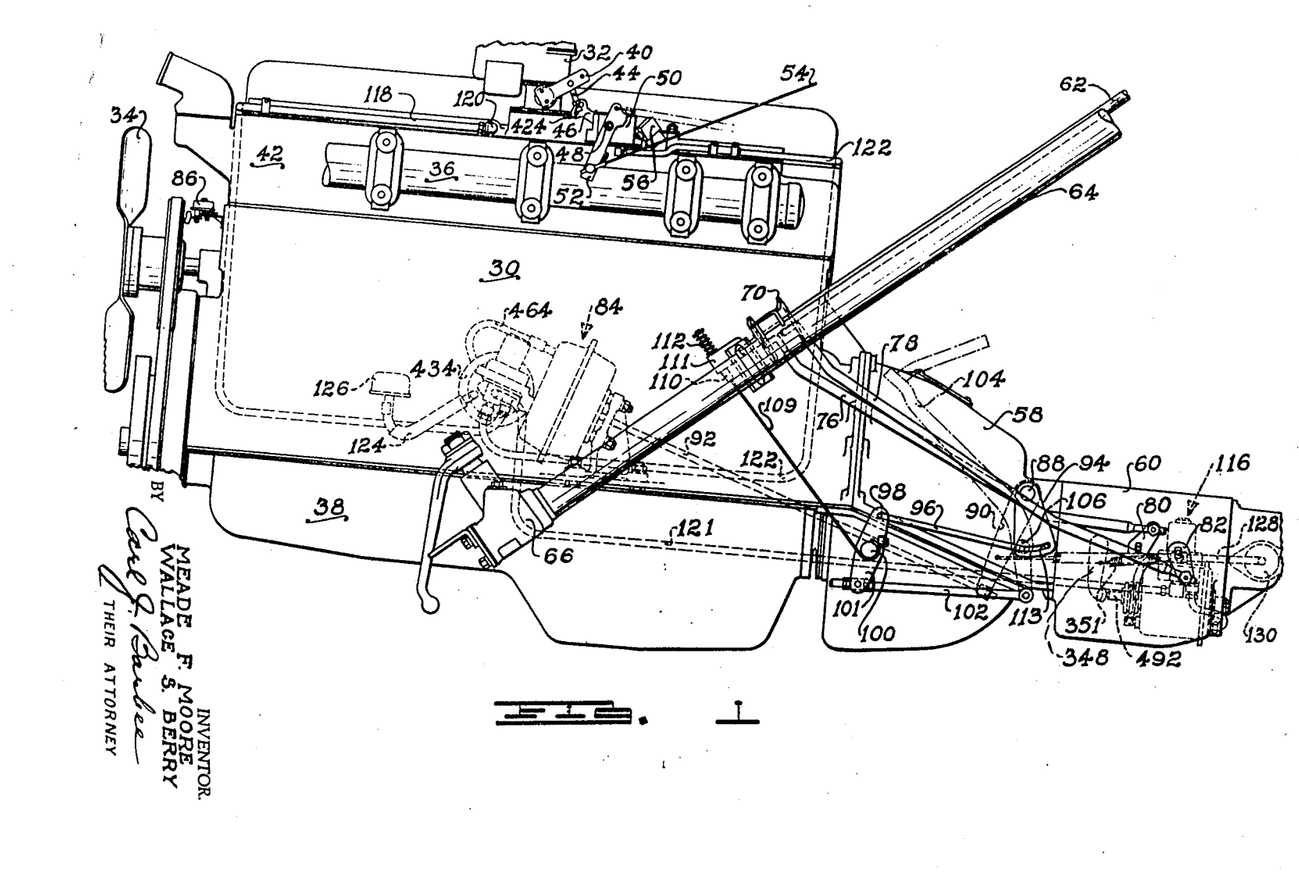
Figure 1 represents a side elevational view of the engine, clutch and transmission of an automotive vehicle together with the operating units for controlling the clutch, transmission and speed of the engine.

By way of example, the drawings illustrate an internal combustion engine 30 of the valve-in-head type provided with a carburetor 32, fan 34, exhaust manifold 36 and oil pan 38. The carburetor 32 is controlled by a throttle valve operated by the lever 40 and discharges into a manifold formed integrally within the head 42 of the engine and not appearing in the drawings. The lever 40 is connected by means of an adjustable link 44 to the arm 46 attached to one end of a throttle switch shaft 48. The shaft 48 extends transversely through the housing of a throttle switch, bleed valve indicated at 50 and is provided at its opposite end with an arm 52 to which is attached the accelerator cable 54. The cable 54 extends to a suitable hand or foot controlled accelerator 676 (see Figure 17) which may be operated by the driver. In the extreme open position of the throttle, the arm 52 is arranged to engage a kick-down switch 56 for a purpose to be described presently. The kick-down switch 56 is supported upon the throttle switch housing 50 which is in turn supported upon the head 42 of the engine.

Figures 2, 14:
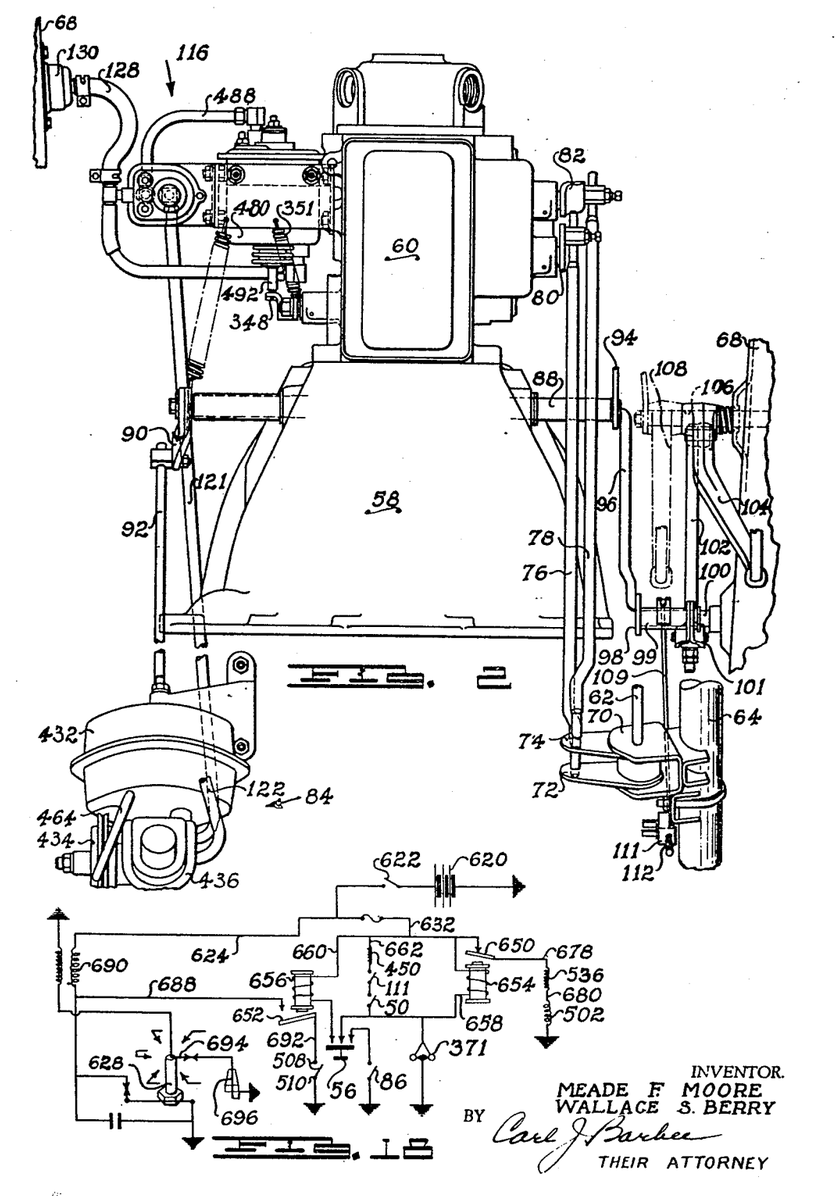
Figure 2 represents a plan view of the clutch and transmission shown in Figure 1 together with the operating units therefor.
Figure 14 represents a vertical sectional view through the transmission control cylinder valve illustrated in Figures 1 and 2.

Attached to the rear end of the engine 30 is a clutch housing 58 and a transmission 60. A shift column 62 for regulating the shifting of the transmission is supported upon the steering column 64. The steering column extends downwardly alongside of the engine 30 to the steering gear 66 which is attached to the frame 68 of the automobile, portions of which are illustrated in Figure 2. A suitable steering wheel and shift lever (not shown) are, of course, provided on the upper ends of the steering column and shift column respectively, by means of which the steering gear may be operated and the shift column may be rotated and moved axially.

The lower end of the shift column 62 is supported in the legs of a U-shaped bracket 70 attached to the steering column 64. The column is moved axially and is arranged to be engageable with either of the arms 72 and 74 (see Figure 2) rotatably mounted on the bracket 70 and to which are attached the shift rods 76 and 78. The rods 76 and 78 extend backwardly and downwardly and are attached to the levers 80 and 82, respectively, carried along the sides of the transmission 60 and attached to rock shafts arranged to shift the gear trains in the transmission in a manner to be described presently. Rotation of the shift column while engaged with either of the arms 72 or 74 will result in axial movement of either the rod 76 or rod 78 which in turn will rotate either the lever 80 or 82 on the transmission and its supporting rock shaft.

Positioned on the right hand side of the engine (when looking from the back to the front of the engine) is a clutch control unit generally indicated at 84 which is arranged to control the engagement and disengagement of the clutch mechanism within the housing 58. A wind switch is carried on the front end of the engine ju behind the fan 34 and is arranged to open circuit in the controlling mechanism when tl forward motion of the car reaches a predete mined rate of speed.

Part of the clutch mechanism within the clutc housing 58 is operated by means of a shaft which extends through the walls of the housir 58 on either side thereof. On the right hand sic of the shaft 88 is secured an arm 90 which connected by means of a rod 92 to the clutch cor trol unit 84 while the left hand side of the sha 88 is provided with an arm 94 to which is at tached a rod 96. The rod 96 extends forwardl to a crank arm 98 secured to a sleeve 99 (see Fig ure 2). The sleeve 99 is mounted on a stub sha 100 supported upon the frame 68. Another cran arm 101 is secured to the opposite end of th sleeve 99 and is connected by means of the ro 102 to the lower end of a clutch pedal 104 pivot ally supported upon a pedal shaft 106 also sup ported upon the frame 68. The pedal shaft 10 also serves to support the brake pedal indicate at 108 (see Figure 2). A cable 109 has its lowe end attached to the sleeve 99 so that rotatio of the sleeve will wrap the cable around the sleev and pull down the plunger 110 of a clutch cut out switch 111 secured to the steering column 64 Pulling down the plunger 110 opens a switch ir the circuit to be described presently. The switcl is closed by the spring 112 when the cable 109 i unwrapped from the sleeve 99.

From the drawings it will be apparent that when the clutch pedal 104 is pressed downwardly rod 102 will be drawn to the rear while sleeve 9$ will be rotated in a counter-clockwise direction drawing the rod 96 forwardly, in turn pulling the lower end of the arm 94 forwardly and imparting a counter-clockwise rotation to the shaft 88 when viewed from the left side of the engine as in Figure 1. This rotation of the shaft 88 serves to disengage part of the clutch mechanism in a manner which will be described presently. Attention is called to the fact that the rod 96 is connected through an arcuate slot 113 in the arm 94 forming a lost motion connection so that the shaft 88 and arm 94 may be rotated by the clutch control unit 84 and rod 92 independently of the clutch pedal 104 and without imparting any movement to the clutch pedal.

Attached to the right hand side of the transmission 60 is a transmission control unit indicated generally at 116. The transmission control unit is arranged to control the engagement of the gear trains in the transmission in a manner to be more particularly described later.

A pipe 118 has one end connected to the intake manifold of the engine at 120 (see Figure 1) so as to be under a vacuum when the engine is running. The other end of the pipe 118 extends around the front end of the motor and down to the clutch control unit 84 from where a second pipe 121 extends backwardly to the transmission control unit 116. A third pipe 122 extends from the throttle switch, bleed valve 50 to the clutch control unit 84 for the purpose of conducting air under atmospheric pressure to the clutch control unit. A pipe 124 extends from the clutch control unit 84 to an air filter 126 while a pipe 128 extends from the transmission control unit 116 to a second air filter 130 (see Figure 2).

The several parts of the driving unit will now be described in detail, after which the controlling circuits and operation of the driving unit as a whole will be described.

Figure 3:
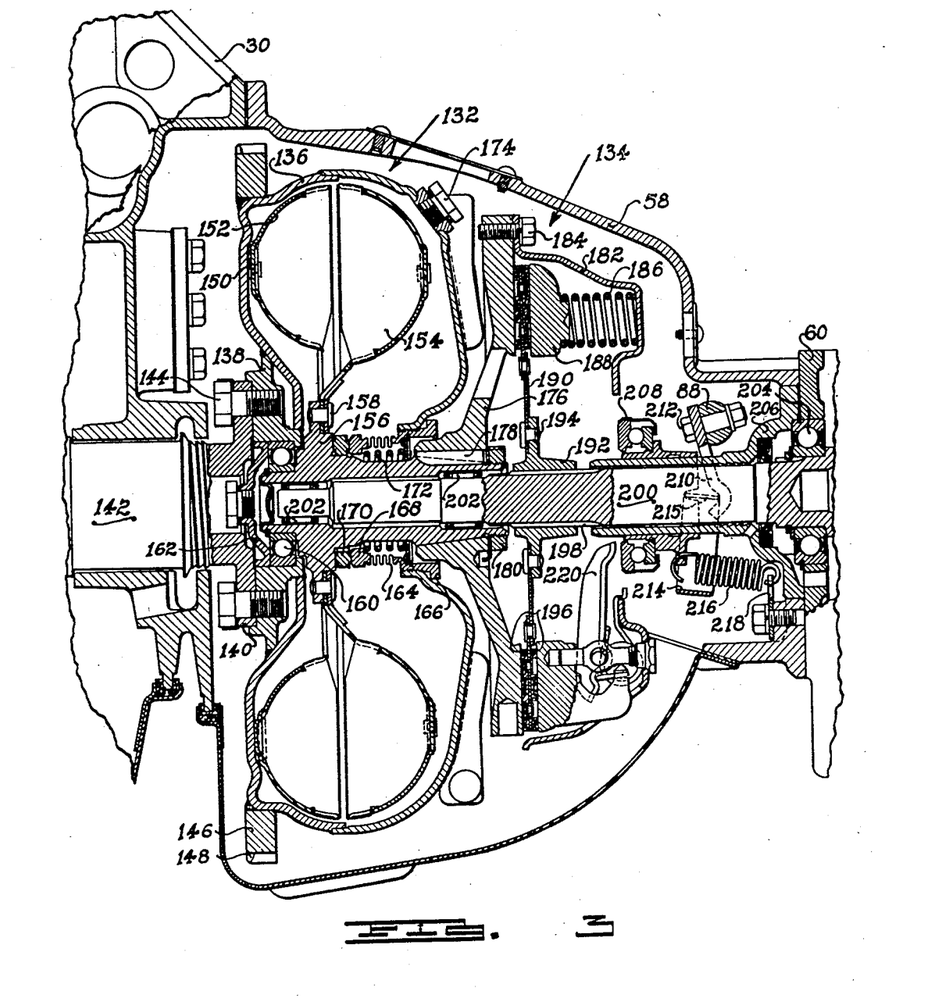
Figure 3 represents a vertical, longitudinal, sectional view through the clutch mechanism shown in Figures 1 and 2.

Considering in greater detail the clutch mechanism within the clutch housing 58, attention is called to Figure 3 which illustrates the clutch mechanism to include a fluid coupling 132 and a dry plate clutch 134. The fluid coupling 132 consists of a closed annular housing 136, the forward face of which is secured as by welding to the annular coupling flange 138. The flange 138 is bolted to the crankshaft flange 140 formed on the rear end of the crankshaft 142 by means of the cap screws 144.

A gear ring 146 having teeth 148 around the outer periphery thereof is secured as by welding around the forward edge of the annular housing 136. The teeth 148 are arranged to be engaged by the pinion teeth of any suitable type of starter motor and serve the same function as the teeth on an ordinary flywheel.

Secured to the inside of the forward wall of the housing 136 as by the rivets 150 are a series of impeller blades 152 which are thus arranged to rotate with the housing 136. Positioned closely adjacent to the impeller blades 152 are a series of driven blades 154 which are positioned radially around and attached to a runner hub 156 as by the rivets 158. The hub 156 is piloted at its forward end in the ball bearing 160 mounted in the center of the annular coupling flange 138. The bearing 160 is retained in place against a shoulder on the flange 138 by the plug 162 pressed into the coupling flange. The rear side of the housing 136 is sealed to the runner hub 156 by means of a Sylphon bellows 164, one end of which is secured to the housing by the threaded seal ring 166 and the other end of which carries the running seal ring 168 pressed against the fixed seal ring 170 by the coil spring 172. The running seal ring 168 is thus carried by the housing 136 and rotates at crankshaft speed. The fixed seal ring 170 is journaled on the runner hub 156 and floats rotatively between the hub and the running seal ring.

The housing 136 is arranged to be partially filled with oil or some other fluid which may be admitted to the housing through the filler plug 174. Thus when the housing 136 is rotated by the crankshaft 142, the impeller blades 152 will force the oil against the driven blades 154, causing them and the hub 156, to which they are attached, to rotate after the housing 136 has reached a speed which will create sufficient pressure on the driven blades 154. At slow speeds, there will be considerable slippage or speed differential between the housing 136 and the driven hub 156 but at higher speeds the fluid in the housing will be thrown into the outer rim of the housing by centrifugal force and the fluid pressure between the impeller blades 152 and the driven blades 154 will be great enough to drive the driven blades at approximately the same speed as the housing. Fluid is prevented from escaping from the housing 136 by the plug 162 and the bellows 164.

The hub 156 is tapered at the rear end and has mounted thereon the clutch mounting flange 176 which is secured for rotation with the hub 156 by means of the key 178. The clutch mounting flange is retained in place on the hub by the retaining nut 180 threaded on the extreme rear end of the hub 156 behind the clutch mounting flange. A clutch spring carrier 182 is secured to the rear face of the clutch mounting flange by means of the cap screws 184 spaced around the periphery of the clutch mounting flange and is arranged to form abutment for the back ends of a series of clutch springs 186. The springs 186 have their forward ends bearing against the annular pressure plate 188, which is urged by the springs toward the clutch mounting flange 176.

A clutch drive plate 190 has its outer edge positioned between the pressure plate 188 and the clutch mounting flange 176 while its center portion is secured to the drive plate hub 192 as by means of the rivets 194. Suitable friction faces 196 are provided on each side of the clutch drive plate between the pressure plate 188 and the clutch mounting flange 176.

The drive plate hub 192 of the clutch is slidably mounted upon the splines 198 formed on the head shaft 200. The forward end of the head shaft 200 is piloted within the runner hub 156 by means of the two needle bearing assemblies 202 while the rear end of the head shaft 200 is rotatably supported in the roller bearing 204 mounted in the forward wall of the transmission 60.

A head shaft bearing retainer 206 is positioned in the rear wall of the clutch housing 58 and extends forwardly around the head shaft 200 to serve as a support for the clutch throwout bearing 208. The throwout bearing 208 is arranged to be moved forwardly by the U-shaped clutch throwout arm 210 secured to the clutch control shaft 88 by the bolts 212. A yoke 214 has its ends 215 positioned between the ends of the clutch throwout arm 210 and slots in the clutch throwout bearing assembly to transmit the force from the arm to the bearing. A coil spring 216 is connected between the throwout bearing hub and a clip 218 secured to the rear wall of the clutch housing to return the throwout bearing to its released position as the clutch shaft 88 is returned to a position corresponding to the engaged position of the clutch 134.

The forward face of the clutch throwout bearing is arranged to bear against the inner ends of a series of clutch throwout levers 220 carried on the spring carrier 182 and to rotate the levers 220 to draw the pressure plate 188 backwardly against the compression of the springs 186 and disengage the friction connection between the drive plate 190 and the clutch mounting flange 176.

The fluid coupling 132 and dry plate clutch 134 just described do not form a part of this invention in themselves and so have not been described in greater detail. However, from the above description it should be apparent that the crankshaft of the engine will drive through the fluid coupling 132 to the runner hub 156, which in turn drives the clutch mounting flange from which power is transmitted to the head shaft 200 by the drive plate 190 when the dry plate clutch is engaged. It will further be noted that the head shaft 200 may be disengaged from the engine by rotation of the clutch shaft 88 or by reason of the engine operating so slowly as to create insufficient pressure within the fluid coupling to form a driving connection therethrough.

Attention is now called to the transmission 60 which is illustrated most clearly in Figures 4 through 9. The transmission consists of a case 230, in the forward wall of which is mounted the bearing 204 which supports the head shaft 200 as was explained before. The rear end of the head shaft 200 has formed thereon the head gear 232 which is in constant mesh with the driving gear 234 of a countershaft gear cluster 236. The countershaft gear cluster is rotatably mounted upon a countershaft 238 supported in the front and rear walls of the case 230 and is provided with a low speed gear 240, a reverse gear 242 and a starting gear 244.

Figures 4, 9:
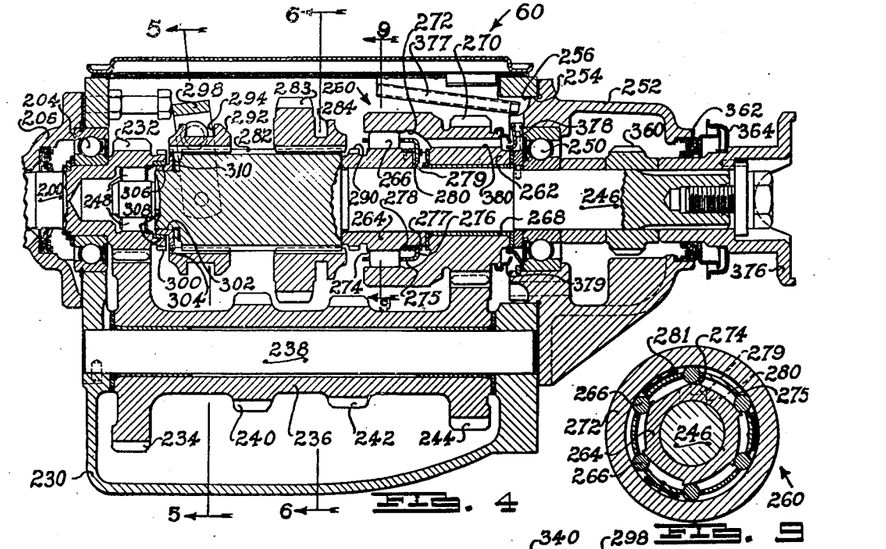
Figure 4 represents a vertical, longitudinal, sectional view through the transmission shown in Figures 1 and 2.
Figure 9 represents a sectional view through the overrunning clutch taken along a plane indicated by the line 9—9 in Figure 4 and looking in the direction of the arrows.

The driven shaft 246 of the transmission has its forward end journaled within the head gear 232 by the roller bearings 248 while its rear end is supported by the ball bearing 250 mounted in a governor housing 252. The governor housing 252 is provided with a forwardly extending flange 254 which extends into an aperture 256 in the rear wall of the case 230 to center the governor housing 252 and ball bearing 250 with respect to the transmission housing 230 and the head shaft bearing 204 at the front of the transmission housing. The governor housing 252 is arranged to be secured to the transmission housing 230 as by means of bolts at 258 (see Figure 7).

Just forwardly of the ball bearing 250 the driven shaft 246 has mounted thereon an overrunning clutch 260 (see Figure 9) consisting of the external driving hub 262, driven internal cam member 264 and the rollers 266. The driving hub 262 is rotatably mounted with respect to the driven shaft 246 on the bearing 268 and has formed around the outer rear edge thereof the gear teeth 270 which are in constant mesh with the teeth of the starting gear 244 on the countershaft gear cluster. The driven cam member 264 is freely journaled on the driven shaft 246 just forwardly of the driving hub 262 while the forward end of the driving hub 262 is provided with a forwardly extending annular flange 272 to extend over the driven cam member and enclose the rollers 266. Cam faces 274 (see Figure 9) are formed around the outside of the cam member 264 so that when the driving hub 262 tends to rotate faster than the cam member 264 and driven shaft 246, the rollers 266 will become engaged with the cam faces and drive the driven cam member from the countershaft gear cluster. The driven cam member 264 is connectable to the driven shaft 246 to drive the shaft in a manner to be described presently. However, when the driven cam member 264 tends to run faster than the driving hub 262, the rollers 266 will move away from engagement with the cam faces 274 so that the cam member will overrun the driving hub and the countershaft gear cluster. It is thus impossible for the driven shaft 246, acting through the driven cam member, to drive the countershaft gear cluster through the overrunning clutch 260.

In order to speed up the engagement and disengagement of the rollers 266 with the cam faces 274, the rollers are retained in slots in an annular cage 275. The rear end of the cage 275 is provided with an inturned annular flange 276 (see Figure 4) which rides on the cam member 264 and is held in position longitudinally of the cam member by the snap ring 277 and coil spring 278. The flange 276 is provided with a radially inwardly extending finger 279 which projects into a notch 280 formed in the cam member 264. The notch is of such a width that the finger 279 and cage 275 may rotate relative to the cam member through a sufficient angular distance to position the rollers 266 either on the cam surfaces 274 or in the depressions between the cam faces.

A series of leaf springs 281 (see Figure 9) have their centers riveted to the cage 275 between adjacent rollers 266 so that the ends of the springs frictionally engage the inside surface of the annular flange 272 on the driving hub 262. Thus, when the driving hub tends to run faster than the cam member, the springs 281 carry along the cage with the driving hub until the finger 279 engages one side of the notch 280 and the roller 266 engage the cam surfaces 274 to form a driving connection through the overrunning clutch 260. However, when the driving hub tends to run slower than the cam member, the springs 281 drag the cage 275 and finger 279 to the other side of the notch 280, in which position the rollers 266 are out of engagement with the cam faces 274 and there is no driving connection through the clutch.

Forwardly of the overrunning clutch 260, the driven shaft 246 is provided with a splined section 282 on which is slidably mounted the low and reverse driven gear 283. The gear 283 is provided with an annular slot 284 within which the shoes 286 of a shift fork 288 are arranged to be positioned (see Figure 6). The shift fork 288 is arranged to move the gear 283 either forwardly or backwardly along the splined section 282 in a manner to be described presently. When the gear 283 is moved forwardly, it will mesh with the teeth of the low speed countershaft gear 240 to provide an emergency low speed gear ratio from the head gear 232 through the countershaft gear cluster 236, gear 240 and gear 283 to the driven shaft 246. When in this gear ratio, it is also possible for the driven shaft 246 to drive through the gear 283 to the gear 240 and head gear 232 permitting the engine to be used as a brake in stopping the vehicle.

When the gear 283 is moved toward the rear, the splines formed on the inside of the gear are arranged to engage the clutch teeth 290 formed on the forward end of the cam member 264 of the overrunning clutch 260. With the gear 283 and clutch teeth 290 thus engaged, a driving connection is established through the head gear 232, countershaft gear cluster 236, starting gear 244, overrunning clutch 260 and through the splines on the driven shaft to drive the shaft 246 from the engine; however, the transmission of power in a reverse direction is prevented by the overrunning clutch 260. It is thus impossible for the momentum of the automobile to drive the engine when the transmission is in starting gear.

Figure 5:
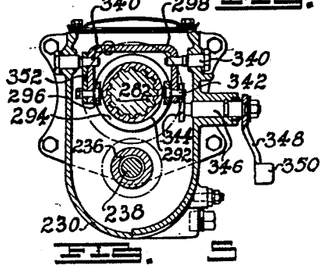
Figure 5 represents a transverse sectional view through the transmission illustrated in Figure 4, taken along a plane indicated by the line 5—5 in Figure 4 and looking in the direction of the arrows.

Mounted on the forward end of the splined section 282 is a clutch collar 292 provided with an external annular groove 294 within which are positioned the shoes 296 of a shift yoke 298 (see Figure 5). The shift yoke 298 is arranged to be rotated in a manner to be described presently to move the clutch collar 292 forward into engagement with the clutch teeth 300 formed on the rear face of the head gear 232. A blocker ring 302 having blocker teeth 304 around the periphery thereof is positioned between the forward end of the splined section 282 and the clutch teeth 300. The blocker ring 302 is provided with a tapered friction face 306 arranged to engage the friction ring 308 carried by the head gear 232 and is constantly urged thereagainst by the annular spring 310. Whenever the head gear 232 is rotated faster than the driven shaft, the friction between the ring 308 and surface 206 will tend to rotate the blocker ring 302 relative to the splined section 282 and against a stop on the splined section (not shown in the drawings), in which position the teeth 304 will be positioned in front of the splines on the inside of the clutch collar 292. When the blocker teeth are in this position, they prevent the clutch collar 292 from being shifted into engagement with the teeth 300. However, movement of the clutch collar presses the blocker teeth and blocker ring more tightly against the friction ring 388 and tends to bring the driven shaft up to the same speed as the speed of the head gear 232. After the speeds are equalized, bevel surfaces on the blocker teeth 304 permit the clutch collar to rotate the blocker ring slightly relative to the driven shaft so that the splines on the clutch collar may slide between the blocker teeth into engagement with the clutch teeth 300 and form a positive direct drive engagement between the head gear and the driven shaft 246. If driving torque is constantly applied from the engine through the starting gear, the blocker ring cannot synchronize the speeds of the head gear and the driven shaft because the ratio of the starting gear demands that the driven shaft turn slower than the head gear. If the torque supplied by the engine is reduced by releasing the accelerator momentarily, the engine and head gear will slow down to near the speed of the driven shaft due to the operation of the overrunning clutch and the blocker ring may then complete the synchronization of the speeds of the two shafts to complete the shift to direct drive.

It is contemplated that the starting gear ratio of the transmission will be sufficiently low enough to start the automobile when on low grades, good roads and all normal road conditions on which the automobile will be started, and that the direct drive connection will provide such a ratio as to drive the car in all normal, forward driving speeds other than starting and low speeds. Attention is called to the fact that when the gear 283 is in engagement with the clutch teeth 290 establishing the starting gear ratio, the direct drive clutch collar 292 may be engaged with the clutch teeth 300 without disengaging the starting gear 283. This is due to the fact that the overrunning clutch 260 will disengage automatically whenever the direct drive clutch is engaged and starts to rotate the driven shaft 246 faster than the driving hub 262 of the overrunning clutch. This arrangement permits the direct drive clutch collar 292 to be engaged by an automatic power cylinder without shifting of the starting gear by the driver. It should be noted that whenever the direct drive clutch collar 292 is engaged with the clutch teeth 300, the driving hub 262 will run slower than the driven shaft 246 due to the fact that the drive shaft is operating at the same speed as the head gear 232 while the ratio between the starting gear 244 and the driven hub is a low speed ratio.

Figure 6:
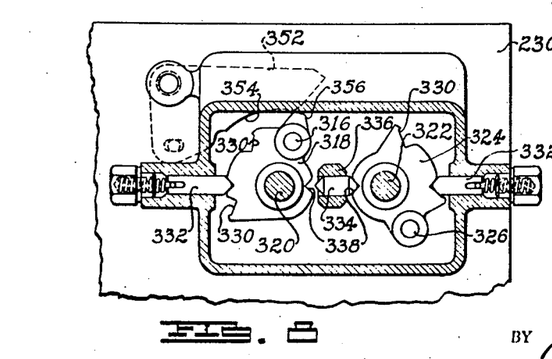
Figure 6 represents a transverse sectional view taken along a plane indicated by the line 6—6 in Figure 4 and looking in the direction of the arrows.
Figure 7:
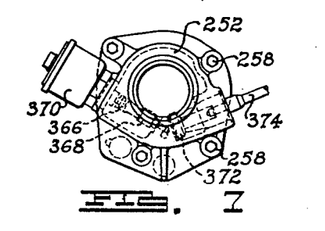
Figure 7 represents a rear elevational view of the transmission illustrated in Figure 4 and showing the governor mechanism attached thereto.

Attention is now called to Figure 6 in which the shift fork 288 is shown to be provided with a stub shaft 316 journaled in a cam 318. The cam 318 is secured for rotation with a rock shaft 320 which extends through the wall of the case 230 and has the shift lever 80 attached thereto. Thus the shifting of the low, reverse gear 283 is accomplished by movement of the shift column 62 operating through the shift rod 76, shift lever 80, rock shaft 320, cam 318 and shift fork 288.

The shift lever 82 and shift rod 78 are connected to a second rock shaft 322 which extends through the wall of the case parallel to the rock shaft 320 and is provided with a cam member 324. Pivotally mounted in the cam member 324 is a shaft 326 which supports a second shift fork (not shown) arranged to move a reverse idler gear 328 (see Figure 6) into engagement with the low, reverse gear 283 to establish a reverse drive gear train from the reverse gear 242 on the countershaft gear cluster through the idler and low, reverse gear 283 to the driven shaft 246.

The cam members 318 and 324 are provided with speed finder detents 330 engageable with the spring pressed pins 332 mounted in the walls of the transmission case. A lockout pin 334 is positioned in a rib 336 between the two cam members and is engageable with lockout notches 338 in the cam members to prevent one of the rock shafts 322 or 320 from being rotated until the other rock shaft is returned to its neutral position.

Consequently, the sliding gear 283 must be in its neutral position as shown in Figure 4 before it is possible to shift the reverse idler pinion into engagement therewith.

The direct drive shift collar 292 (see Figure 5) is moved axially along the splined section 282 of the driven shaft 246 by means of the shoes 296 carried on the ends of the U-shaped shift yoke 298. The shift yoke 298 is pivotally supported along its upper edge by means of the pins 340 which extend through opposite side walls of the transmission case 230.

The right hand side of the shift yoke 298 is provided with an extending pin 342 which is engaged in a slot in the arm 344. The arm 344 is securely fastened to the rock shaft 346 which extends out through the right side wall of the transmission case and has securely fastened thereto the shift lever 348. The lower end of the shift lever 348 is provided with a pad 350 arranged to be engaged with the operating shaft 492 (see Figures 1 and 11) of the transmission control unit 116. The shaft of the control unit is arranged to press the pad 350 and lever 348 forwardly to disengage the direct drive collar 292 from the teeth 300 while a spring 351 (see Figures 1, 2 and 17) is stretched between the lever 348 and a fixed portion of the transmission control unit to constantly urge the lever backwardly toward a position to engage the transmission in direct drive ratio.

Figure 8:
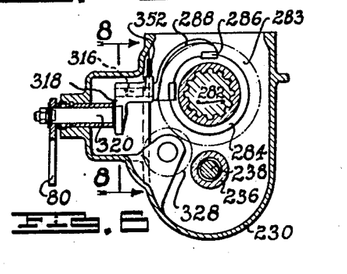
Figure 8 represents a sectional view taken along a plane indicated by the line 8—8 in Figure 6 and looking in the direction of the arrows.

The left hand side of the shift yoke 298 has securely fastened thereto a lockout cam 352 which extends backwardly to a position over the cam member 318 on the rock shaft 320 (see Figure 8). The cam 352 is provided with a lower lockout surface 354 which engages the lock-out point 356 on the cam 318 and prevents the shift yoke 298 from being rotated to engage the direct drive clutch collar 292 until such time as the cam member 318 and rock shaft 320 have been rotated to move the low, reverse gear 283 into engagement with the teeth 290 of the overrunning clutch 260. This arrangement prevents damage to the transmission from any accidental grounding or breaking in the wiring of the shift mechanism such as might cause the direct drive clutch collar 292 to be engaged with the teeth 300 while the remainder of the transmission is in either emergency low, neutral or reverse gear ratios.

The governor housing 252 on the rear end of the transmission housing encloses a governor gear 260 which is secured near the rear end of the driven shaft 246 for rotation with the driven shaft. A seal 362 and slinger rings 364 prevent the entrance of dirt and moisture into the governor case 252. Extending obliquely into the left side of the governor case 252 (see Figure 7) is a governor shaft 366 which carries a gear 368 engageable with the governor gear 360 to drive a centrifugal governor mechanism mounted within the housing 370. The centrifugal governor is arranged to open a switch 371 (see Figure 17) in an electrical circuit when the speed of the driven shaft rises to a predetermined point. When the speed of the governor falls below a certain point, the switch will again be closed. Any suitable type of centrifugal governor may be employed in the structure so it has not been described in more detail. The governor gear 360 also serves to drive the speedometer gear 372 which turns the shaft in the flexible speedometer cable 374.

The rear end of the driven shaft 246 is provided with a coupling member 376 which is arranged to connect the driven shaft to any suitable propeller shaft or universal joint for driving the wheels of the vehicle from the driven shaft.

The overrunning clutch 260 is lubricated by a novel arrangement (see Figure 4) of the trough 377, fixed collector ring 378 and rotatable collector ring 379. The trough is secured to the transmission case above and to the side of the overrunning clutch where it will collect oil thrown off of the clutch by centrifugal force. The trough slopes backwardly and delivers the oil into the top of the fixed collector ring 378 which has a forwardly extending, cylindrical flange positioned around the end of the driving hub 262 and within the rear end of the rotatable collector ring 379. The rotatable collector ring 379 is secured to the driving hub and rotates therewith. Oil coming from the trough 377 through the fixed ring 378 will be thrown outwardly in the rotatable ring until the ring in full and then will flow through the longitudinally extending passage 380 formed in the driving hub 262. From the forward end of the passage 380, the oil will be thrown outwardly against the annular flange 272 where it will lubricate the rollers 266.

Figures 10, 11, 12, 13, 14, 15, 16:
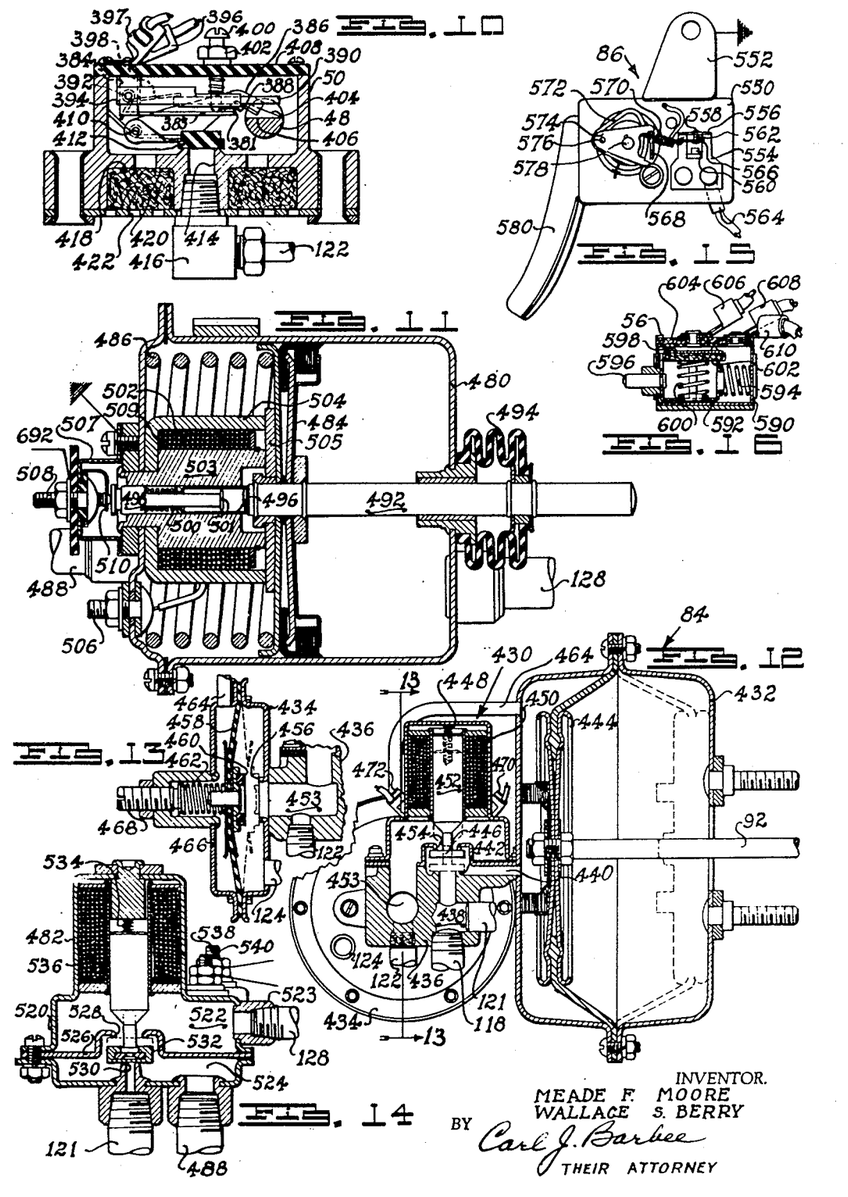
Figure 10 represents a vertical sectional view through the throttle switch and bleed valve shown in Figure 1.
Figure 11 represents a vertical sectional view through the transmission control cylinder illustrated in Figures 1 and 2.
Figure 12 represents a vertical sectional view through the vacuum clutch control unit illustrated in Figures 1 and 2.
Figure 13 represents a sectional view taken along a plane indicated by the line 13—13 in Figure 12 and looking in the direction of the arrows.
Figure 15 represents a plan view of the wind switch illustrated in Figure 1 with the cover of the switch removed.
Figure 16 represents a sectional view through the kick-down switch illustrated in Figure 1.

Turning now to the mechanism for controlling the clutch and transmission, attention is called to Figure 10 which illustrates the construction of the throttle switch and bleed valve 50. The switch portion of the member 50 consists of a fixed contact 381 mounted upon an arm 383 which extends from a terminal strip 384 secured to the cover plate 408. The movable contact 388 is mounted upon an arm 390 pivotally supported at 392 to the terminal strip 394 also secured to the cover 408. The terminal strips 384 and 394 extend through the cover 408 and have suitable terminals 396 and 397, respectively, secured thereto for the attachment of conductor wires. The movable arm 390 is constantly urged downwardly to engage the movable contact 388 with the fixed contact 381 by the spring 398. The position of the fixed contact 381 is adjustably determined by the screw 400 and lock nut 402. By turning down the screw 400, the position of the fixed contact 381 may be lowered and the position fixed by tightening the lock nut 402.

The throttle switch shaft 48 which extends through the housing of the bleed valve 50 is provided with a cam surface 404 arranged to engage the free end of the movable arm 390 and lift the movable contact 388 away from the fixed contact 381, thus breaking the electrical circuit between the terminals 396 and 397.

The throttle switch shaft 48 is also provided with another cam surface 406 which is arranged to engage and lift the free end of a valve arm 386 pivotally supported within the case of the bleed valve 50 at 410. The valve arm 386 carries the rubber or other deformable valve 412 which, in its lowered position, closes the port 414. The port 414 provides communication through a fixture 416 between the interior of the valve switch case and the pipe 122.

The valve switch case of the bleed valve 50 is provided with a perforated portion 418 on the underside of which is positioned a mass of filter material 420 held in place by the perforated plate 422. Thus air which reaches the pipe 122 through the port 414 and the interior of the case of the bleed valve 50 must first pass through the filter material 420 and be freed of dust and impurity.

Attention is called to the fact that the cam surfaces 404 and 406 on the throttle switch shaft 48 are so arranged that on rotation of the shaft 48 to open the throttle of the engine, the switch 381, 388 will first be opened, after which the valve 412 will be moved away from the port 414 admitting air under atmospheric pressure to the pipe 122. It will further be noted from Figure 1 that the arm 46 which operates the carburetor throttle from the shaft 48 is provided with a slot 424 so that the shaft 48 may rotate sufficiently to open the switch 381, 388 before the throttle valve of the carburetor 32 is opened.

The pipe 122 which extends from the throttle switch, bleed valve 50 is connected at its other end to the clutch control unit 84 shown in detail in Figures 12 and 13.

The clutch control unit 84 consists generally of a control valve assembly 430 to which is attached the clutch operating cylinder 432 and the clutch cushion cylinder 434. The valve unit 430 comprises a body 436 defining a vacuum passage 438 with which the pipe 118 from the engine intake manifold and the pipe 121 to the transmission control unit communicate. The passage 438 also communicates with the passage 440 through the valve port 442. The passage 440 opens into the clutch operating cylinder 432 on the forward side of the clutch operating diaphragm 444.

The valve port 442 is arranged to be opened or closed by the solenoid operated valve 446 which is normally urged to its lower position, shown in dotted lines, by the spring 448 but which may be raised to its open position, shown in full lines, by action of the solenoid coil 450 on the enlarged upper end 452 of the valve.

The valve body 436 also defines a passage 453 which communicates with the pipe 122 from the throttle switch, bleed valve described above. The passage 453 communicates through a port 454 with the passage 440 communicating with the clutch operating cylinder 432. When the valve 446 is in its raised position, it is arranged to close the port 454 and prevent communication between the passage 440 and the passage 453. One end of the passage 453 communicates with the clutch cushion cylinder 434 through the port 456 as is most clearly shown in Figure 13.

The clutch cushion cylinder 434 is divided by the cushion diaphragm 458, on the center of which is mounted a valve ring 460 arranged to close the port 456 when the diaphragm is moved to the right, as indicated by the dotted lines in Figure 13. A spring 462 normally urges the diaphragm toward the closed position of the port 456.

Communicating with the cushion cylinder 434 on the same side of the cushion diaphragm 458 as the port 456 is the pipe 124, the other end of which extends to the air filter 126 (see Figure 1) and is open to the atmosphere so that the cushion cylinder 434 on the right hand side of the diaphragm 458 is constantly under atmospheric pressure. The space within the cushion cylinder 434 on the other or left hand side of the diaphragm 458 communicates with the interior of the clutch operating cylinder 432 through the pipe 464 so as to be at all times under the same pressure as the left hand side of the clutch operating cylinder. A small bleed port 466 is formed in the wall of the cushion cylinder 434 for a purpose which will be described presently, and the compression on the spring 462 may be adjusted by turning the threaded bolt 468 which forms an abutment for one end of the spring.

The clutch operating diaphragm 444 divides the clutch operating cylinder into two spaces and has securely fastened thereto one end of the clutch operating rod 92. The diaphragm and rod are so arranged that when vacuum is admitted to the space on the left hand side of the diaphragm through the passage 440, the diaphragm and rod will be drawn to the left, as shown in full lines in Figure 12, or forwardly of the engine, and will disengage the clutch 134 (see Figure 3).

The operation of the clutch control unit is as follows:

When the solenoid coil 450 is energized and when the engine 30 is operating to create a vacuum in the pipe 118, the valve 446 will be raised to its full line position shown in Figure 12, thus connecting the left hand side of the clutch operating cylinder to the manifold and creating a vacuum ahead of the diaphragm 444. The space ahead of the diaphragm being under a vacuum, the space on the left hand side of the cushion diaphragm 458 will also be under a vacuum by reason of the connection between the two spaces through the pipe 464, and the diaphragm 458 will be drawn to the left, opening the port 456 and admitting air under atmospheric pressure from the pipe 124 to the passage 453. This air under atmospheric pressure is prevented from passing through the port 454 to the clutch operating cylinder by the raised position of the valve 446. If the coil 450 is now de-energized, the spring 448 will press the valve 446 downwardly and will open the port 454 and close the port 442, thus admitting air under atmospheric pressure through the pipe 124, port 456, passage 453 and port 454 to the space ahead of the clutch operating diaphragm 444. As the vacuum in the clutch operating cylinder collapses, the diaphragm 444 and rod 92 will move to the right toward the engaged position of the clutch 134 but at the same time the vacuum on the left hand side of the cushion diaphragm 458 will collapse due to the connection through the pipe 464 and the diaphragm 458 will move to the right to close the port 456 and prevent further entrance of air through the pipe 124.

It is contemplated that the compression on the spring 462 which urges the diaphragm 458 and valve ring 460 toward the port 456 will be so adjusted that the port 456 will be closed after the clutch operating diaphragm 444 and clutch rod 92 have been moved toward clutch engaging position sufficiently to bring the clutch 134 to what is known as a cushion point, in which it will drag slightly but in which it will not be engaged tightly enough to transmit full driving power. After the diaphragms 458 and 444 have reached the cushion point, the clutch may be completely engaged by further admission of atmospheric air into the clutch operating cylinder 432 through the pipe 122. This may be accomplished by opening the throttle switch valve 412 shown in Figure 10 to admit air to the pipe 122. The cushioning arrangement just described is for the purpose of slowly engaging the clutch and preventing jerky operation of the automobile. The small bleed port 466 in the cushion cylinder 434 will slowly admit air to the cylinder 434 and from thence through the pipe 464 to the cylinder 432. If the port 442 is open to the vacuum pipe 118, this air will be immediately evacuated, but if both the ports 442 and 456 in the clutch control unit and port 414 in the bleed valve 50 are closed, the air entering through the bleed hole will gradually destroy the vacuum in the cylinder 432 and cause full engagement of the clutch 134. The bleed hole 466 is provided to prevent the clutch 134 from staying at the cushion point indefinitely should the operator open the circuit through the coil 450 but fail to open the valve 412. Continued operation of the clutch at its cushion point would cause undue wear of the friction surfaces 196.

The solenoid coil 450 receives its energy through the two terminals 470 and 472 which are connected in an electrical circuit which will be described presently.

The transmission control unit 116 consists of a transmission operating cylinder 480 (see Figure 11) and a transmission control valve 482 (see Figure 14). The operating cylinder 480 encloses a piston 484, on one side of which is positioned the coil spring 486 which constantly urges the piston to the right as viewed in Figure 11 or toward the front of the transmission. The forward end of the cylinder is connected through a pipe 488 to the space 524 within the control valve 482. The rear end of the cylinder 480 is connected by the pipe 128 to the air filter 130 (see Figure 1) and so is constantly under atmospheric pressure.

Connected to the center of the piston 484 is the shift rod 492 which projects through the front wall of the cylinder 480 and is sealed against the leakage of air therearound by the flexible bellows 494. The left end of the rod 492 projects through the piston 484 and is provided with a hollow portion 496 within which the follower pin 498 is slidably mounted. The follower pin 498 is constantly urged toward the left by the coil spring 500 and is provided with a flange 501 engageable with the end of the hollow portion 496 to limit the travel of the follower pin relative to the rod 492.

Positioned telescopically within the coil spring 486 and around the left end of the rod 492 is the solenoid holding coil 502, which, when energized, is arranged to aid in drawing the piston 484 and rod 492 to the left against compression of the spring 486. The holding coil 502 is wound around the core 503 and within the open end cup member 504, each of which is made of magnetic material to increase the magnetic pull of the coil. An annular metal plate 505 carried on the piston 484 and around the rod 492 is arranged to abut against the ends of the core 503 and cup 504 as shown to complete the path for the magnetic flux around the coil when the piston is in its extreme left position. Thus the magnetic effect of the coil will be strongest when the piston is moved all the way to the left and will hold the piston in that position even though the vacuum in the pipe 488 should fail. The holding coil 502 has one end connected to the terminal 506 and its other end grounded to the body of the cylinder 480 as at 509.

A cap member 507 secured around the end of the follower pin 498 supports a terminal 508 which is insulated from the cap. A spring mounted terminal 510 which is grounded to the cap 507 of the cylinder 480 normally extends out of contact with the terminal 508. The spring mounted terminal 510 is arranged to be pressed around the insulated terminal 508 by the follower member 498 when the piston 484 and rod 492 are moved to the left, thus grounding the terminal 508 for a purpose which will be described presently. As the piston 484 and rod 492 move to the right, the follower pin 498 and coil spring 500 will maintain the spring mounted terminal 510 in contact with the insulated terminal 508 until the rod 492 has moved far enough for the end of the hollow portion 496 to pick up the flange 501 on the follower pin to draw the follower pin away from the spring mounted terminal. The spring mounted terminal 510 will then move away from the insulating terminal 508, removing the ground connection therefrom.

The transmission control valve 482 for controlling the admission of the vacuum to the transmission control cylinder consists of a valve body 520 divided into an upper space 522 and a lower space 524 by the partition 526. The partition 526 defines the port 528, permitting communication between the spaces 522 and 524. The pipe 121 which conducts vacuum from the clutch control unit 84 communicates with the space 524 through the port 530. The port 530 and the port 528 are controlled by the valve 532, one port being closed while the other is open and vice versa. The valve 532 is normally urged into its downward position, shown in full lines in Figure 14, by the coil spring 534 but may be raised to its upper, dotted line position closing the port 528 by energizing the solenoid coil 536. The solenoid coil 536 obtains its energy through the two terminals 538 and 540. The upper space 522 in the valve body 520 has a connection 523 with the pipe 128 which extends from the air filter unit 130 to the transmission operating cylinder 480 as shown in Figures 1 and 2. Thus space 522 is open to the atmosphere, which may be admitted to the transmission control cylinder when the port 528 is open. When the port 530 is open, vacuum is supplied to the cylinder 480 through the space 524 and pipe 488.

The wind switch 86 mounted on the front of the engine 30 is disclosed in more detail in Figure 15 and consists of a base 550 which is mounted on, and grounded to, the engine by the bracket 552. Secured to the base and insulated therefrom is a live contact plate 554 which has an upstanding flange 556 bearing the fixed contact 558. An insulated stop 560 is mounted in spaced relationship with the fixed contact 558 on the opposite side of a movable contact 562. The live plate 554 is provided with a terminal 564 for connection into the circuit of the control system.

The movable contact 562 is mounted upon a plate 566, the forward end of which is pivoted against a base plate 568 and drawn thereagainst by the coil spring 570. The forward end of the coil spring 570 is attached to a triangular shaped ring 572, the forward point of which is pivotally supported by the pin 574. The pin 574 is carried by the triangular plate 576 which, in turn, is securely fastened to the shaft 578. The shaft 578 extends downwardly through the base 550 in which it is pivotally supported, the vane 580 being fast to the shaft 578 beneath the base 550. The vane 580 being positioned behind the fan 34, is arranged to rotate when the velocity of the air stream created by the fan and motion of the vehicle reaches a certain point. Since the velocity of the air stream is governed by the speed of the fan and vehicle, the switch may be arranged so that the vane 580 will rotate the shaft 578 and plate 576 in a counter-clockwise direction as viewed in Figure 15 when a predetermined minimum air speed is exceeded. This will swing the pin 574 in a counter-clockwise direction around shaft 578 so that a line extended through the axis of the pin 574 and the anchorage of the spring 570 upon triangular shaped ring 572 will fall beneath the point of attachment between the plate 566 and the base plate 568, as viewed in Figure 15, or to the left thereof as assembled in the car. In this position the spring 570 will draw the plate 566 and movable contact 562 away from the fixed contact 558 and break the connection with the terminal 564 to ground. When the speed of the fan 34 and the motor is reduced below a predetermined value, the vane 580 will assume its original position and close the switch 558, 562.

The kick-down switch 56, which is mounted on the throttle bleed valve and switch, is illustrated in more detail in Figure 16 and consists of a case 590 within which the contact carrier 592 is slidably positioned and constantly urged toward a forward position by the coil spring 594. The pin 596 is secured to the contact carrier 592 and projects through the front wall of the case 590 where it may be engaged by the throttle arm 52 as was explained in connection with Figure 1. A contact plate 598 is carried on the top of the carrier 592 and is constantly urged upwardly by the coil spring 600. The contact plate 598 is insulated from the carrier and spring by a sheet 602 of insulating material. The top of the case 590 is closed and the contact plate 598 held downwardly against compression of the spring 600 by the non-conducting cover 604 which has three contacts 606, 608 and 610 secured thereto by means of rivets which project through the cover plate 604 and which are arranged to come in contact with the contact plate 598 when the plate is moved to the right by movement of the pin 596 and carrier 592. Thus all three contacts 606, 608 and 610 are arranged to be connected together by movement of the pin 596 backwardly into the case 590.

The various parts of the control mechanism having been described individually, attention is now called to Figures 17 and 18 which show the wiring and piping diagrams which connect the various elements of the system and which illustrate the manner in which the system operates. The system is shown in an at rest position such as it would assume when the automobile is standing with the ignition turned off.

Power for operating the electrical portions of the system is obtained from the battery of the automobile indicated at 620 at the right side of Figure 17. The engine ignition switch 622, when opened, cuts off the electrical system from the battery. From the ignition switch 622, one conductor 624 extends to the primary winding of the ignition coil 626 connected in series with the breaker points of the distributor 628 of the engine through another conductor 630 in the normal manner of practically all automobile engines today.

Branching off from the conductor 624 is the conductor 632 which passes through a fuse 634 and is attached to the terminal 636 of a relay block 638. The relay block 638 is provided with five other terminals 640, 642, 644, 646 and 648. Within the relay block are positioned two solenoid operated switches 650 and 652. The switch 650 is arranged to assume a closed position when the coil 654 is de-energized. Switch 652 is arranged to assume an open position when the coil 656 is de-energized. Thus, energizing the coil 654 will open switch 650 while energizing coil 656 will close switch 652.

The coil 654 is connected between terminals 636 and 648 by the conductor 658 while coil 656 is connected between terminals 636 and 644 by the conductor 660. Switch 650 is connected between terminals 636 and 646 while switch 652 is connected between terminals 640 and 642.

From terminal 636, which is connected directly to the battery as explained above, a conductor 662 extends to one terminal 470 of the clutch control, solenoid coil 450. The other terminal 472 of the clutch control coil is connected by means of the conductor 664 to the clutch cutout switch 111, the other terminal of which is connected by means of the conductor 666 with the terminal 396 of the throttle switch, bleed valve 50. From the throttle switch, bleed valve 50, the circuit continues from the terminal 397 through a conductor 668 to the contact 608 of the kick-down switch 56. The contact 608 is also connected to a conductor 670 which extends to the terminal 648 on the relay block. From the terminal 648, still another conductor 672 extends to the governor 370 and through the switch 371 of the governor is attached to ground as indicated at 674. Thus when the ignition switch 622 is closed, a circuit is completed from the battery 620 through the path just described to ground at the governor 370, the automobile being at rest. Completion of this circuit energizes the clutch control solenoid 450 so that when the engine is started so as to create a vacuum in the pipe line 118, the clutch control unit will operate as has been described to disengage the clutch 134.

It will be noted that the circuit through the clutch control solenoid may be broken in three places, the first being the clutch cutout switch 111 which opens whenever the clutch pedal is depressed manually. The switch 111 opens during the initial movement of the clutch pedal 104. This switch is included in the circuit to enable the driver of the automobile to disconnect the automatic clutch control unit so that he may maneuver the automobile with entirely manual operation of the clutch 134 by means of the pedal 104. If the switch 111 was not included in the circuit of the clutch control unit and the driver attempted to operate the clutch manually, he might find the clutch pedal entirely free at some times and relatively stiff and resistant to manual movement at other times due to automatic disengagement or engagement of the clutch by reason of opening and closing of the throttle switch, bleed valve 50. This alternate low and high resistance to movement of the clutch pedal would be disconcerting to the driver and might even lead to injury should the entire force of the clutch engaging springs 186 suddenly be thrown on the clutch pedal by movement of the clutch control unit to clutch engaging position at a time when the driver had only tensed his muscles to operate the freely movable clutch pedal. Switch 111 also permits the driver of the automobile to feel the engagement of the clutch as in normal manual clutch operation.

Another point at which the clutch control circuit may be broken is in the throttle switch 50 which opens the circuit between the terminals 396 and 397 when the accelerator 676 is pressed downwardly to open the throttle of the engine. As was explained in connection with the operation of the throttle switch, bleed valve 50, initial movement of the accelerator 676 breaks the contact between the terminals 396 and 397, de-energizes the coil 450 and brings the clutch 134 to the cushion point just prior to the time at which the engine commences to accelerate. Further movement of the accelerator 676 opens the bleed valve 412, causing complete engagement of the clutch 134 and acceleration of the engine.

The third point for opening the clutch control circuit is as the governor switch 371 which may be arranged to open whenever the governor reaches any predetermined speed. It is contemplated that the governor switch 371 will be arranged to open as soon as the automobile attains a speed of approximately fifteen miles per hour but other speeds may be selected. After the governor switch 371 is open, it will be impossible to energize the clutch control coil 450 no matter what position the accelerator pedal 676 and throttle switch, bleed valve 50 assumes so that it is impossible for the clutch control unit to disengage the clutch at speeds above fifteen miles per hour. This permits the inertia and friction of the engine to be used as a brake for slowing the automobile from speeds above fifteen miles per hour. It is also possible to adjust the governor switch 371 so that it will not close until the speed of the automobile has fallen below a speed considerably lower than fifteen miles per hour, thus permitting the braking effect of the engine to be utilized down to a much lower speed.

The circuit for operating the transmission control unit may be traced from the relay block terminal 636, through the switch 650 and terminal 646 to the conductor 678 which is attached to one terminal 538 of the transmission control solenoid coil 536. From the other terminal 540 of the control coil 536, a conductor 680 extends to the terminal 506 of the transmission control cylinder, which is in turn connected to one end of the solenoid coil 502. Since the other end of the coil 502 is grounded as at 682, a circuit will be completed through the transmission control valve solenoid 536 and transmission coil 502 whenever the switch 650 is closed.

The switch 650 will be closed as was explained above whenever the relay coil 654 is de-energized. This will occur when the ignition switch is open but then, of course, no current would be available to operate the transmission control unit so this condition of the relay is unimportant. However, the relay coil 654 will be energized by a circuit extending from the terminal 636 through the conductor 658 to the terminal 648 and from there through the conductor 672 to the governor switch 371 whenever the governor switch is closed, or, in other words, at speeds of the automobile below fifteen miles per hour. It thus appears that the switch 650 will be opened and the transmission control unit will be de-energized at all speeds of the automobile below fifteen miles per hour. However, when the speed of the automobile exceeds fifteen miles per hour and the governor switch 371 opens, the circuit through the relay coil 654 will be broken and the switch 650 will close, energizing the transmission control valve coil 536 and the transmission holding coil 502. Energization of these latter two coils will operate to admit vacuum to the transmission operating cylinder 480 through the pipes 488 and 121 as was explained before and to draw the transmission control piston 484 back against the compression of the spring 486, thus permitting the spring 351 to shift the lever 348 into a position corresponding to direct drive speed ratio in the transmission 60.

Attention is called to the fact that the governor switch 371 controlled by the speed of the automobile has the dual function of controlling the circuit to shift the transmission into and out of direct drive ratio and of controlling the clutch control circuit so that the clutch control unit will be effective or ineffective to operate automatically. It should further be noted that the clutch will operate automatically when the transmission is in starting gear ratio but will not operate automatically when the automobile is in direct drive ratio.

It is often desirable for the operator of an automobile to be able to shift from a high speed ratio to a lower speed ratio while traveling at relatively high speeds which normally require only the high speed ratio. The lower speed ratio may be desired to obtain additional torque for accelerating past another vehicle or to climb a steep grade. In order to permit the driver of the automobile to obtain the starting gear ratio at speeds above fifteen miles per hour, the present system provides what is known as a kick-down circuit through which the operator may cause the transmission to be shifted to starting gear by pressing the accelerator 676 completely down, thus drawing the throttle lever 52 back against the pin 596 of the kick-down switch 56.

As was explained in connection with the kick-down switch 56, pressing in on the pin 596 will connect the contacts 606, 608 and 610 together. The contact 606 is connected by means of the conductor 684 to the terminal 564 of the wind switch 86 and, except when the wind switch 86 is open, the terminal 564 will be connected to ground. This closing of the kick-down switch 56 connects the conductor 670, which is connected to the contact 608 of the kick-down switch, to ground. The other end of the conductor 670 is attached to the terminal 648 of the relay block and forms one end of the relay coil 654. A circuit is thus established from the battery 620 and terminal 636 through the relay coil 654, kick-down switch 56, to ground, energizing the coil and causing the switch 650 to be opened. Opening the relay switch 650 de-energizes the transmission control valve solenoid coil 536 and the transmission coil 502 and permits the spring 486 and the vacuum ahead of the piston 484 to move the piston 484 and rod 492 toward the shift lever 348 to disengage the direct drive ratio in the transmission.

Another consequence of closing the kick-down switch 56 is to connect the contact 610 to the grounded contact 606, thereby connecting one end of the conductor 686 to ground. The other end of the conductor 686 is attached to the terminal 644 of the relay block which forms one end of the relay coil 656. Since the other end of the coil 656 is connected to the terminal 636 by the conductor 660, a complete circuit from the battery to ground at the wind switch, when the wind switch is closed, is established through the relay coil 56, energizing the coil and closing the switch 652. One side of the switch 652 is connected through the terminal 640 and conductor 688 to the negative side of the primary winding 690 (see Figure 18) of the ignition coil 626 between the ignition coil and breaker points. The other side of the switch 652 is connected to the terminal 642 from which the conductor 692 extends to the insulated terminal 508 carried on the end of the transmission operating cylinder 480.

If the transmission operating cylinder 480 and piston 484 are not energized and are in a position to maintain the transmission in the starting gear ratio, the closing of the switch 652 will be of no consequence since the end of the conductor 692 is open at the insulated terminal 508. Therefore, closing the kick-down switch 56 by opening the throttle wide at speeds below fifteen miles per hour or when the transmission is in starting gear, will have no effect on the transmission. Thus the driver may manipulate the throttle to obtain full power of the engine in starting gear ratio without causing any connection in the control mechanism.

However, if the transmission operating cylinder 480 is energized or in direct drive position and in a position to permit the spring 351 to hold the transmission in direct drive ratio, the shift rod 492 will lie inwardly within the cylinder 432 in a position in which the follower pin 498 presses the spring contact 510 against the insulated terminal 508, thus grounding the end of the conductor 692 as was explained in connection with the transmission control unit. A ground is thus established for the circuit just described through the negative end of the primary or low voltage side of the ignition coil between the coil and the breaker points of the distributor 628. As a result, the primary coil is constantly energized and the breaker points have no effect to create collapsing fields of magnetic flux which are normally available to fire the spark plugs 696.

The effect of grounding the circuit through the primary coil 690 is to interrupt the operation of the engine 30 so that no driving torque will be applied from the clutch teeth 300 to the direct drive clutch collar 292. This is to remove friction forces between the teeth 300 and the clutch collar 292 and permit disengagement of the collar 292 by the spring 351.

It will be noted that the engine grounding circuit through the conductor 688 and 692 is established at the same time that the energizing circuit through the transmission control unit and conductor 678 is broken. Thus the transmission control unit will immediately start to move the shift rod 492 toward the shift lever 348 to disengage the direct drive clutch collar 292 while the simultaneous grounding of the ignition circuit makes this disengagement possible as was explained above. In order to be certain that the direct drive clutch collar 292 is entirely disengaged before the ignition circuit is reestablished, the follower pin 498 carried by the rod 492 will maintain the spring mounted contact 510 in contact with the insulated terminal 508 for a definite period of time after the rod 492 has commenced to move away from the terminal 508 due to the expansion of the coil spring 500 as was explained before. However, after the rod 492 has moved far enough to disengage the direct drive clutch collar, the flange 501 on the follower pin 498 will be picked up by the end of the hollow portion 496 and the follower pin 498 will then be moved away from the spring mounted contact 510 with the rod 492, thus removing the ground connection from the insulated terminal 508 and conductor 692. This removes the ground from the primary or low voltage coil 690 and permits re-establishment of the ignition circuit through the distributor breaker points to permit operation of the engine in normal fashion.

A particular advantage of the above described method of grounding the ignition circuit in the kick-down position of the accelerator is that the continued establishment of the grounding circuit is not dependent upon the position of the accelerator pedal 676 and will be automatically reestablished as soon as the transmission has been shifted. Thus it is impossible for the operator to permanently cut out the engine 30 by holding the accelerator pedal continuously in its completely depressed position.

The function of the wind switch 86 in the grounding circuit for the ignition is for the purpose of rendering the kick-down circuit inoperative to shift the transmission to starting gear at speeds above a predetermined minimum. In the present instance, the wind switch is arranged to open at a speed of approximately forty miles per hour. Above forty miles per hour, the vane 580 will be blown back by the fan 34 and will open the contacts 558 and 562 so that closing of the kick-down switch 56 cannot operate the relay 656 and switch 652. The wind switch 86 is provided because the torque characteristics of the ordinary engine are such that there is very little difference in the torque or power available in different gear ratios at higher speeds. Therefore, there is very little advantage in shifting from a high speed ratio to a lower speed ratio at speeds above forty miles per hour. In fact, enough time will elapse during the shifting of the transmission from direct to starting gear (at speeds above forty miles per hour), during which time no power is being applied to the wheels of the automobile, to lose any advantage in acceleration of the automobile that might be gained in starting gear over leaving the transmission in direct drive.

From the foregoing description it will be apparent that the driving unit provides emergency low and reverse gear ratios which are manually operable in the normal fashion, together with a starting gear and direct drive ratio which are both automatically operable, depending upon the speed of the automobile, and selectable at the will of the driver at speed ranges between fifteen and forty miles per hour for acceleration purposes. These various driving ratios are further operable concurrently with an automatically operable clutch, the automatic operation of which may be manually overruled by the operator so as to be operated in the normal manual fashion by the driver. Both the transmission and clutch mechanism are connected to the engine through a fluid coupling so that the various shifting operations in the transmission and engagement of the clutch will be accomplished smoothly and without jerking the automobile. The inclusion of the automatic clutch between the fluid coupling and the transmission assures that the automobile will not creep while left in gear with the engine running, as when the automobile is stopped temporarily for a traffic light. The system provides either entirely automatic or manual control of the automobile at the preference of the driver and, during automatic operation thereof, requires a minimum of attention from the driver.

With the transmission as described, the driver may start the engine with the transmission in neutral or starting gear. From neutral he may shift the transmission to emergency low, reverse or starting gear by manipulating the shift rod 62. This may be done while disengaging the clutch automatically by closing the throttle or while disengaging the clutch manually by use of the pedal 104.

In order to get from reverse or emergency low to starting gear, the shift rod 62 must be operated but after engaging the starting gear, operation of the transmission is automatic. After the speed of the automobile has risen to fifteen miles per hour, opening of the governor switch energizes the transmission control unit and permits the spring 351 to draw the shift lever 348 toward direct drive position. However, if constant driving torque is supplied by the engine, the direct drive clutch will not engage due to the action of the blocker ring 302 as was explained before. The driver may thus accelerate in starting gear to speeds above fifteen miles per hour. By momentarily raising the accelerator and relieving the driving torque, the transmission can then be caused to shift into direct drive ratio. When in direct drive, the transmission may be shifted to starting gear by pressing the accelerator pedal completely down to operate the kick-down switch. This, however, is effective only at speeds below forty miles per hour. The automobile may be slowed down and brought to a stop and then started without touching the gear shift lever. It should be remembered that the specific speeds mentioned are by way of example only and that the mechanism may be adjusted to shift at different speeds.

While we have described our invention in some detail, we intend this description to be an example only and not as a limitation of our invention, to which we make the following claims:

1. In combination with an automobile having an engine, a throttle for controlling the speed of said engine, a clutch and a transmission; a first automatic means for engaging and disengaging a speed ratio in said transmission, other automatic means for engaging and disengaging said clutch, an electrical control circuit for controlling said first automatic means and including a relay operated switch, a second electrical control circuit for controlling said other automatic means, a relay circuit for operating said relay switch, said second control circuit and said relay circuit being arranged in parallel from a common source of energy, means responsive to speed of the automobile for establishing a common ground connection for completing said parallel circuits, and means selectively operable by the driver of the automobile for establishing a second common ground connection to said parallel circuits.

2. In combination with an automobile having a throttle controlled engine, a clutch and a transmission; automatic means for engaging a gear ratio in said transmission, automatic means for engaging said clutch, an electrical circuit for controlling said automatic transmission controlling means, said circuit including a relay operated switch, an electrical circuit for controlling automatic clutch operating means, an electrical circuit for supplying ignition current to said engine, a grounding circuit for rendering said ignition circuit inoperative, said grounding circuit including a second relay operated switch, a pair of relay circuits for operating said relay switch, said pair of relay circuits being connected in parallel with said clutch control circuit, a connection forming a common ground for said clutch control circuit and one of said relay circuits, a speed responsive switch in said connection arranged to remove said ground above a predetermined speed of said automobile, and a selectively operable switch arranged to provide a second ground connection to all three of said parallel circuits.

3. In combination with an automobile having a main clutch and a transmission with a plurality of gear trains therein; an overrunning clutch in one of said gear trains, automatic means for engaging and disengaging said main clutch, other automatic means for engaging and disengaging one of said gear trains other than the train including said overrunning clutch, a control circuit for controlling said main clutch operating means, a parallel control circuit including a relay for controlling said other automatic means, a conductor for establishing a common ground for said circuits, and a switch responsive to the speed of the automobile positioned in said conductor.

MEADE F. MOORE.
WALLACE S. BERRY.

REFERENCES CITED

The following references are of record in the file of this patent:

UNITED STATES PATENTS

| Number | Name | Date |
|---|---|---|
| 2,199,095 | Banker | Apr. 30, 1940 |
| 2,214,100 | Claytor | Sept. 10, 1940 |
| 2,237,297 | Banker | Apr. 8, 1941 |
| 2,237,944 | Maurer | Apr. 8, 1941 |
| 2,257,674 | Dunn | Sept. 30, 1941 |
| 2,257,838 | Claytor | Oct. 7, 1941 |
| 2,267,464 | Iavelli | Dec. 23, 1941 |
| 2,277,799 | Syrovy et al. | Mar. 31, 1942 |
| 2,280,002 | Neracher | Apr. 14, 1942 |
| 2,296,290 | Mayrath | Oct. 22, 1942 |
| 2,309,468 | Matulaitis | Jan. 26, 1943 |
| 2,333,668 | Neracher et al. | Nov. 9, 1943 |